United States Patent
Barrow et al.

(10) Patent No.: US 7,024,341 B2
(45) Date of Patent: Apr. 4, 2006

(54) METHODS AND APPARATUS FOR ELECTRONICALLY MODELING AIRCRAFT ENGINE HARNESSES

(75) Inventors: Patrick Barrow, Cincinnati, OH (US); Dustin Lee Meyers, Mason, OH (US); James Stephen Hoelle, Hamilton, OH (US); Kenneth Alvin Jungeberg, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 889 days.

(21) Appl. No.: 09/780,814

(22) Filed: Feb. 9, 2001

(65) Prior Publication Data

US 2002/0111778 A1      Aug. 15, 2002

Related U.S. Application Data

(60) Provisional application No. 60/241,560, filed on Oct. 19, 2000.

(51) Int. Cl.
*G06F 17/50* (2006.01)
(52) U.S. Cl. .................. 703/1; 29/872; 345/419; 345/420; 345/427; 700/97
(58) Field of Classification Search .............. 703/1; 29/872; 700/97; 345/419, 420, 427
See application file for complete search history.

(56) References Cited

U.S. PATENT DOCUMENTS

| 3,867,616 A | 2/1975 | Korelitz et al. |
| 4,928,233 A | 5/1990 | Millis |
| 5,138,698 A * | 8/1992 | Aldrich et al. .............. 345/427 |
| 5,260,883 A | 11/1993 | Wilson |
| 5,293,479 A | 3/1994 | Quintero et al. |
| 5,504,687 A | 4/1996 | Wolf |
| 5,506,950 A | 4/1996 | Hughes et al. |
| 5,517,428 A | 5/1996 | Williams |
| 5,524,198 A | 6/1996 | Matsumoto et al. |
| 5,555,406 A | 9/1996 | Nozawa |
| 5,590,255 A | 12/1996 | Takeshima et al. |
| 5,680,525 A | 10/1997 | Sakai et al. |
| 6,268,871 B1 | 7/2001 | Rice et al. |
| 6,330,746 B1 * | 12/2001 | Uchiyama et al. ............ 29/872 |

FOREIGN PATENT DOCUMENTS

EP        0891021 A2        1/1999

* cited by examiner

*Primary Examiner*—Kamini Shah
*Assistant Examiner*—Herng-der Day
(74) *Attorney, Agent, or Firm*—William Scott Andes; Armstrong Teasdale LLP

(57) ABSTRACT

A modeling system that converts a three-dimensionally defined aircraft engine harness in a two-dimensional electronic model, a process known as unfolding, is described. The modeling system electronically unfolds the three-dimensionally defined harness to create a two-dimensional representation, while simultaneously determining a plurality of design parameters. The drawing and the design parameters are displayed in a format that may be used for inspection purposes and manufacturing purposes. More specifically, the modeling system determines branch angles, wire lengths, and a plurality of angles of the three-dimensionally defined harness.

18 Claims, 7 Drawing Sheets

METHODS AND APPARATUS FOR ELECTRONICALLY MODELING AIRCRAFT ENGINE HARNESSES

This application claims priority to the provisional patent application filed Oct. 19, 2000, Ser. No. 60/241,560.

BACKGROUND OF THE INVENTION

This invention relates generally to aircraft engine harnesses and, more particularly, to modeling systems used to model aircraft engine harnesses.

Aircraft engines typically include a plurality of wiring harnesses used to electrically couple a plurality of engine components. Each harness includes a plurality of connectors electrically coupled with a plurality of wire cables. The harnesses typically include a plurality of wire cable branches extending in various angles and directions from a central wire cable.

During an initial assembly of an aircraft engine, an engine mock-up is utilized to determine how each wiring harness should be routed across the engine. More specifically, rope is often routed across the engine to simulate the wiring harness and to produce a template of each wiring harness.

Once the desired assembled condition for each wiring harness is determined, each wiring harness is physically untwisted and measured to determine an unfolded state. After the unfolded state of each wiring harness is determined, drawings are generated for manufacturing and inspection. Because of the complexity of the aircraft engines, the harnesses are often complex, and the process of determining an unfolded state for each of the wiring harnesses may be a time-consuming, challenging, and laborious task, and may not yield accurate results.

BRIEF SUMMARY OF THE INVENTION

In an exemplary embodiment, a modeling system converts a three-dimensionally defined aircraft engine harness into a two-dimensional electronic model. Specifically, the modeling system electronically unfolds the three-dimensionally defined harness to create a plurality of two-dimensional stick format drawings that are viewable along a plurality of orientations. Furthermore, a processor executing the modeling system determines a plurality of design parameters for the harness and displays the drawings and design parameters in a format that may be used for inspection purposes and manufacturing purposes. More specifically, the processor determines a plurality of angles, diameters, and lengths employed within the three-dimensionally defined harness. As a result, the modeling system facilitates accurately unfolding three-dimensionally defined harnesses to create two-dimensional electronic representations in a cost-effective and reliable manner.

DETAILED DESCRIPTION OF THE INVENTION

Figure 1:
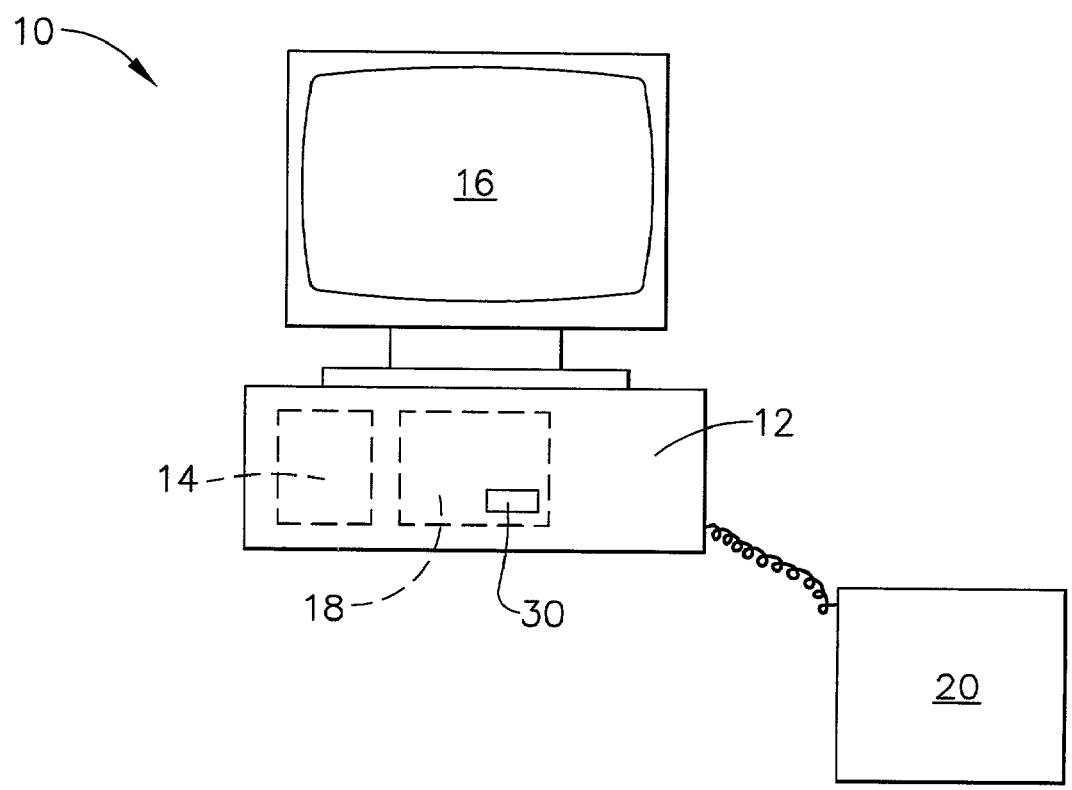
FIG. 1 is a system block diagram.

FIG. 1 is a block diagram of a processing system 10 according to one embodiment of the present invention. Processing system 10 includes a central processing unit (CPU) 12, a random access memory (RAM) 14, an output device 16, for example a monitor, a mass storage device 18, and an input device 20, for example a keyboard. Processing system 10 may be a single user system, for example, a microcomputer, or a multi-user system including a server (not shown) and a plurality of devices (not shown) connected to the server. In one embodiment, processing system 10 is accessible via the Internet through many interfaces including through a network, such as a local area network (LAN) or a wide area network (WAN), through dial-in-connections, cable modems and special high-speed ISDN lines. Additionally, system 10 may include multiple input devices 20, i.e., a keyboard, a mouse, or various automated data input devices, i.e., an optical scanner (not shown). A modeling system program 30 is stored in mass storage device 18 and is executed by processing system 10. In one embodiment, modeling system program 30 uses icds wiring that is similar to icds bracket disclosed in U.S. Pat. No. 5,689,435.

Figure 2:
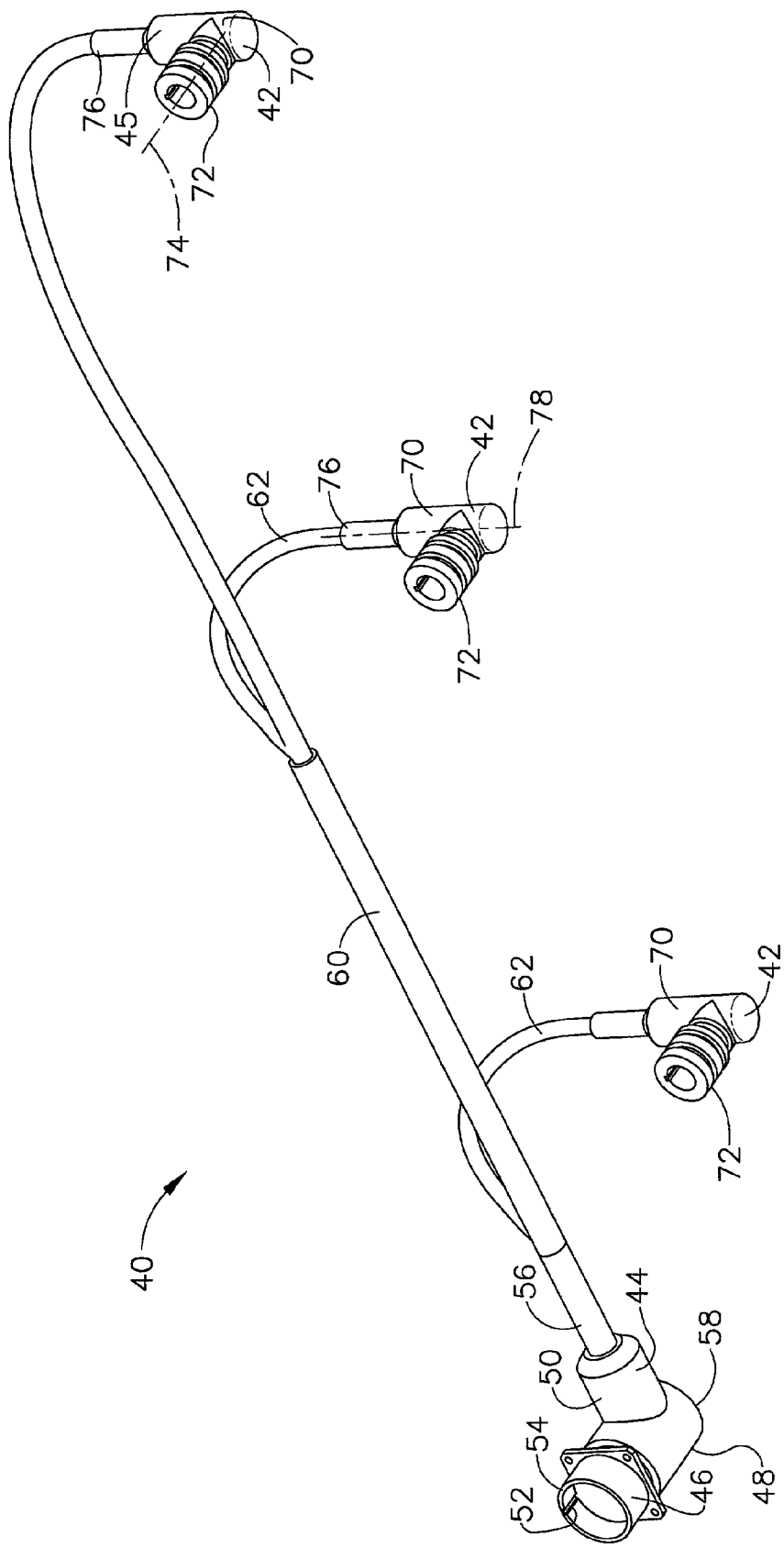
FIG. 2 is a perspective view of an aircraft engine harness.

FIG. 2 is a perspective view of an exemplary aircraft engine harness 40 including a plurality of connector fittings 42 and at least one base connector 44. More specifically, aircraft engine harness 40 is a three-dimensionally defined harness. Harness connector fittings 42 connect with various aircraft engine components (not shown) to enable harness 40 to electrically couple the aircraft engine components. In the exemplary embodiment, aircraft engine harness 40 includes three connector fittings 42 and one base connector 44. A connector fitting 45 is known as an end connector fitting.

Base connector 44 includes a receptacle portion 46, a base portion 48, and a wire connection portion 50. Receptacle portion 46 extends outwardly from base portion 48 and has a substantially circular cross-sectional profile. A key 52 extends from a connect point 54 of receptacle portion 46 inward towards base portion 48. Receptacle portion key 52 ensures base connector 44 is connected to the aircraft engine component in a proper orientation with respect to the aircraft engine component.

Base connector base portion 48 extends concentrically from base connector receptacle portion 46 to wire connection portion 50. Wire connection portion 50 extends substantially perpendicularly from base portion 48 to an outer end 56, such that an elbow 58 is defined between base connector base portion 48 and wire connection portion 50. Wire connection portion 50 connects to a wire cable 60.

Wire cable 60 extends from base connector 44 to end connector fitting 45. A plurality of flexible cable branches 62 extend between wire cable 60 and each connector fitting 42 to electrically couple each connector fitting 42 to wire cable 60. Cable branches 62 extend in a plurality of angular orientations and planar and non-planar directions from wire cable 60.

Each connector fitting 42 includes a body portion 70 and a receptacle portion 72. Receptacle portion 72 extends substantially perpendicularly from body portion 70 and includes a key (not shown) and a center axis of symmetry 74. The receptacle portion key ensures that each connector fitting 42 is attached to a respective aircraft engine component in a proper orientation with respect to the aircraft engine component. Each body portion 70 extends between a connect point 76 and receptacle portion 72, and includes a center axis of symmetry 78.

Figure 3:
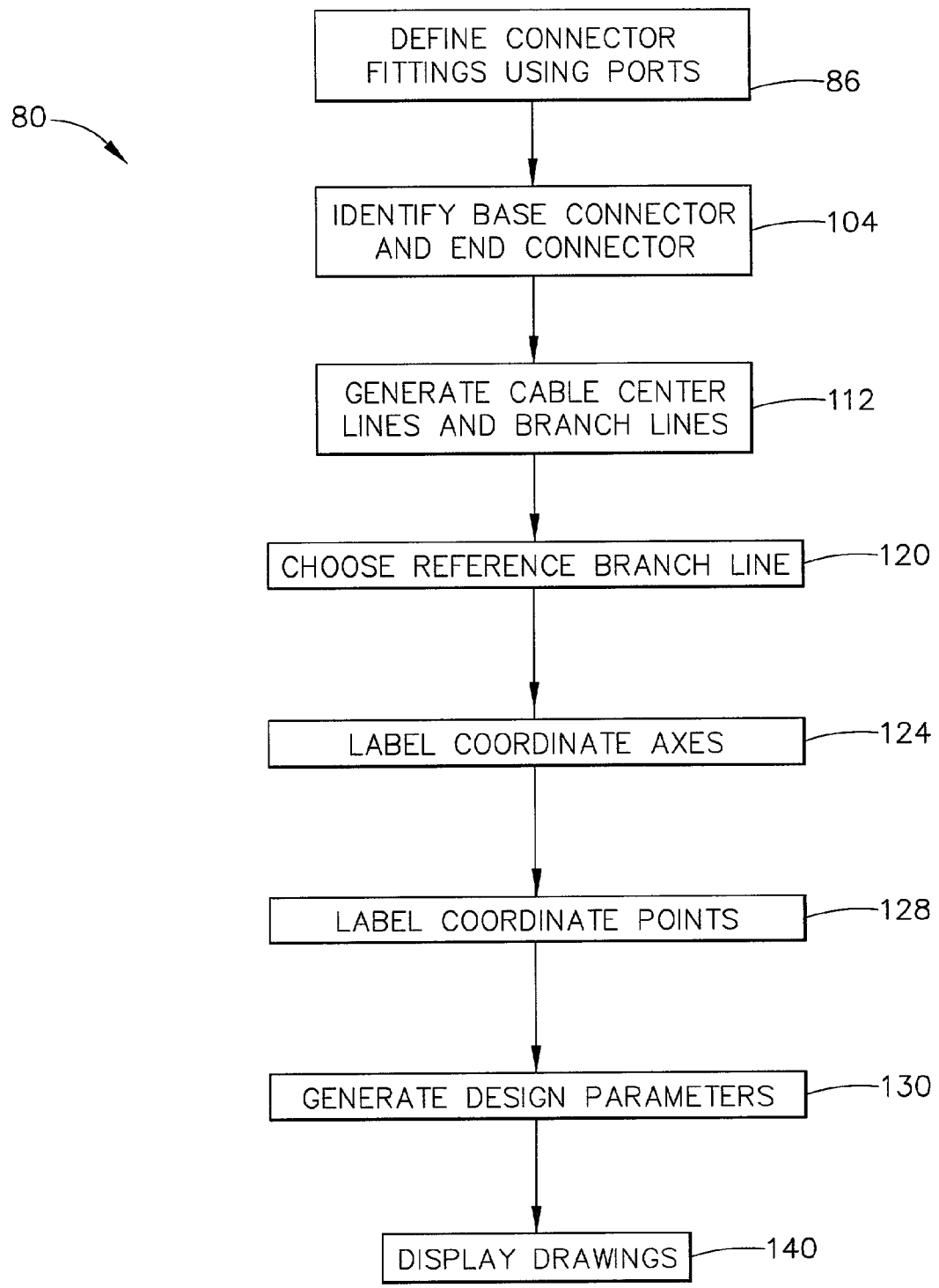
FIG. 3 is a flowchart of a modeling system for generating a two-dimensional electronically modeled aircraft engine harnesses from a three-dimensional harness definition, such as the aircraft engine harness shown in FIG. 2.
Figure 4:
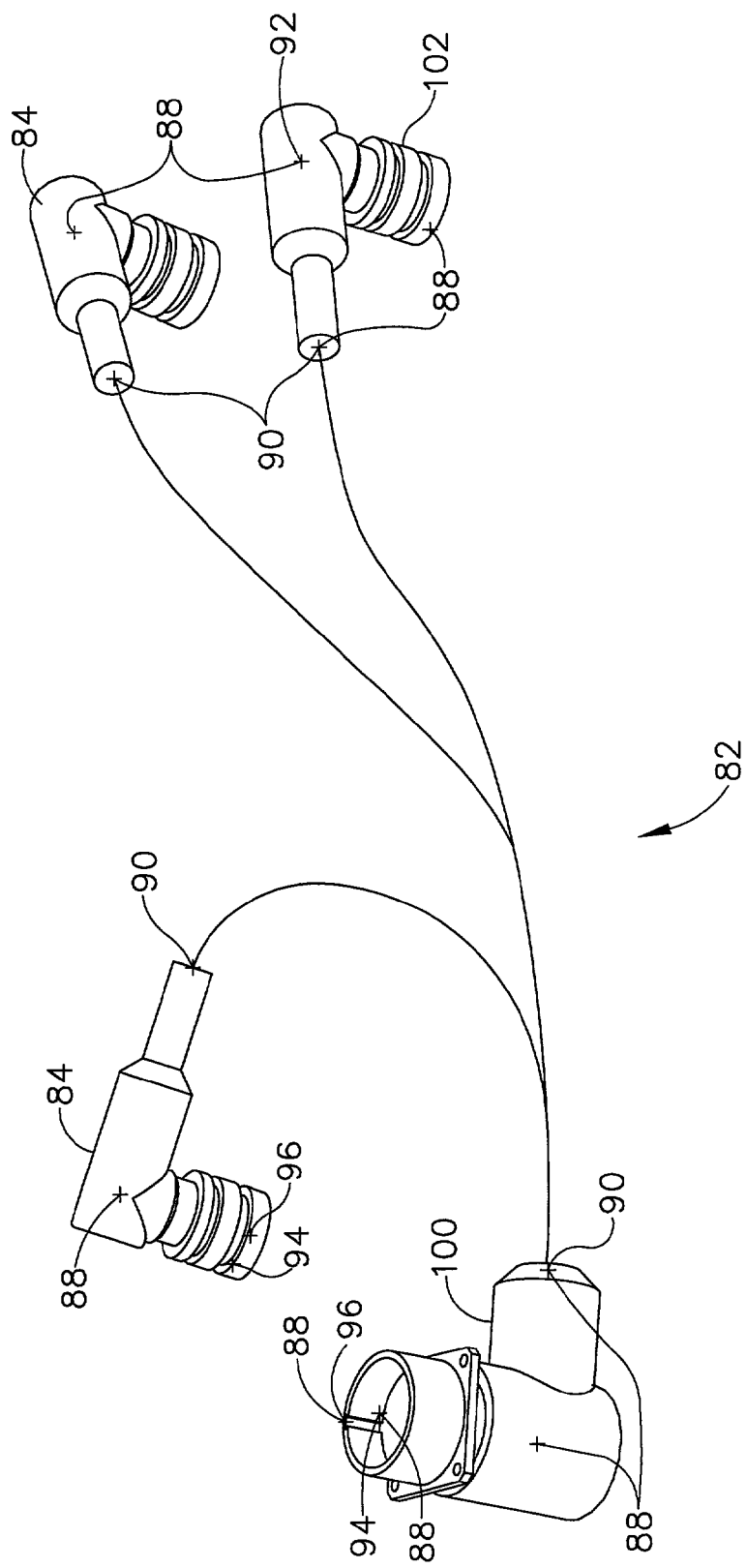
FIG. 4 is an exemplary aircraft engine harness generated using the modeling system shown in FIG. 3.
Figure 5:
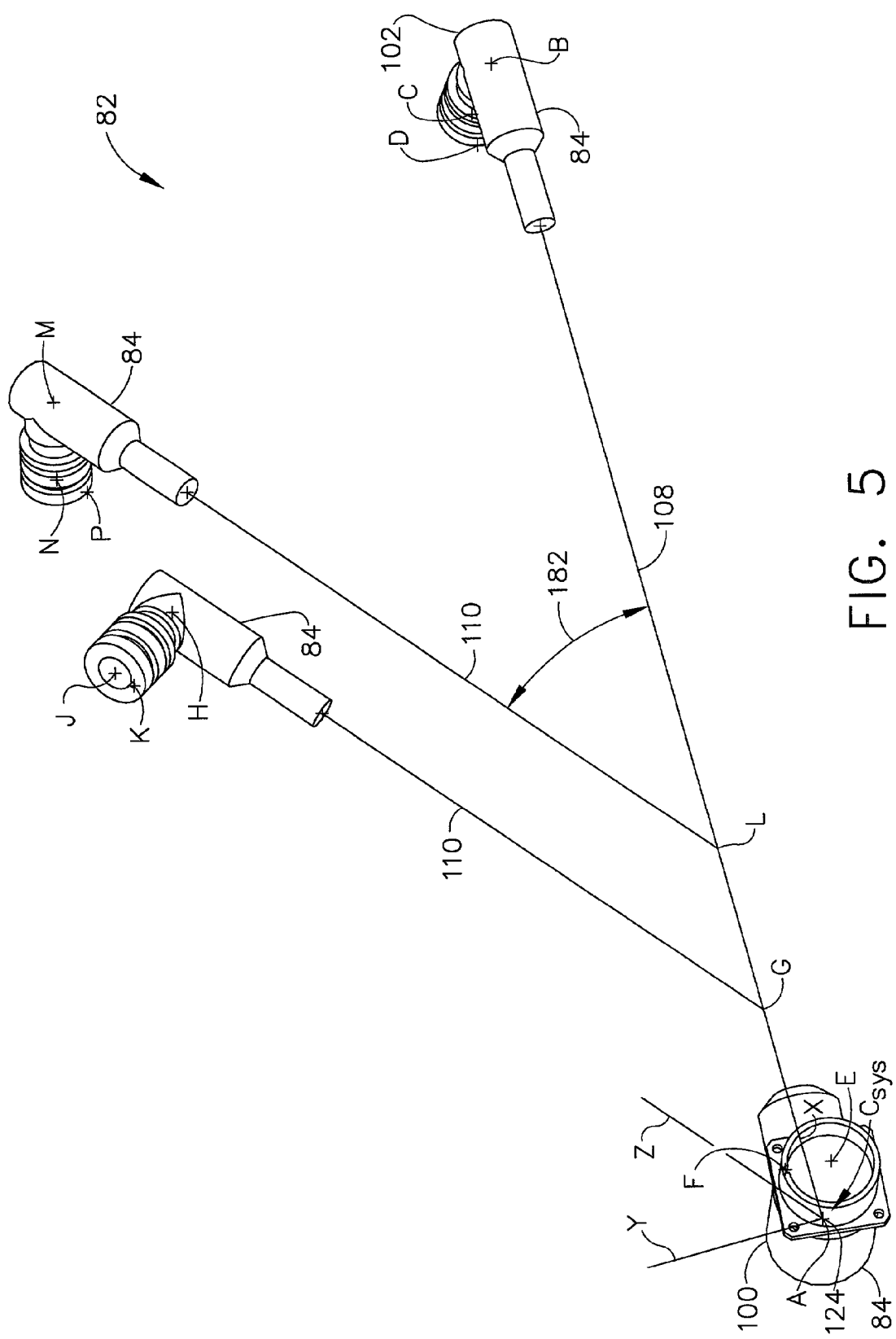
FIG. 5 is the exemplary aircraft harness shown in FIG. 4 including references used with the modeling system shown in FIG. 3.

FIG. 3 is an exemplary embodiment of an information flow diagram 80 illustrating process steps executed by processing system 10 under the control of program 30 (shown in FIG. 1). FIGS. 4 and 5 illustrate exemplary outputs generated with program 30. Executing information flow diagram 80 with processing system 10 under the control of program 30 generates a two-dimensional electronically modeled aircraft engine harness 82 from a three-dimensionally defined harness, such as aircraft engine harness 40 (shown in FIG. 2).

Initially, to generate two-dimensional electronically modeled aircraft engine harness 82, connector fittings 84 are defined 86 using a plurality of connector fitting ports 88 as shown in FIG. 4. Specifically, each connector fitting 84 is defined 86 in terms of a connector port 90, a direction port 92, a free port 94, and a key port 96. Each connector fitting 84 is defined using (X, Y, Z) coordinates.

More specifically, each connector port 90 identifies a connector fitting connect point 76 (shown in FIG. 2). Each direction port 92 identifies an intersection between connector fitting receptacle portion center axis of symmetry 74 (shown in FIG. 2) and connector fitting body portion axis of symmetry 78 (shown in FIG. 2). Each free port 94 identifies a connector fitting receptacle portion 72 (shown in FIG. 2), and each key port 96 identifies the connector fitting receptacle portion key.

After each connector fitting 84 is defined 86, a base connector 100 and an end connector 102 are identified 104 and then defined 86 using connector fitting ports 88. More specifically, connector fitting ports 90, 92, 94, and 96 are used to identify portions of base connector 100 and end connector 102 that are respectively identical to those connector fitting portions identified above with the same connector fitting port. Accordingly, base connector 100, end connector 102, and each connector fitting 84 are defined 86 using four connector fitting ports 88.

After base connector 100 and end connector 102 are defined 86, a cable center line 108 and branch lines 110 are generated 112 as shown in FIG. 5. Cable center line 108 extends linearly between base connector 100 and end connector 102, and branch lines 110 extend linearly between cable center line 108 and each respective connector fitting 84.

One branch line 110 is then chosen 120 to be a reference branch line. After branch line 110 is chosen 120, an X and Y plane are established and a reference coordinate axes $C_{sys}$ is labeled 124 at base connector 100. Additionally, coordinate points A, B, C, D, E, F, G, H, J, K, L, M, N, and P are labeled 128 representing each connector fitting port 88 previously defined and branch points G and L representing an intersection between each branch line 110 and cable center line 108.

Design parameters, described in more detail below, for aircraft engine harness 82 are then generated 130. Additionally, a two-dimensional electronically modeled aircraft harness drawing (not shown in FIGS. 4 and 5) is generated. More specifically, program 30 converts a three-dimensionally defined harness 40 into a two-dimensional stick form drawing that represents harness 40. Converting harness 40 into a two-dimensional stick form drawings is sometimes referred to as unfolding. Program 30 facilitates defining harness 40 quickly, reliably, and in a condition that is suitable for manufacturing and inspection.

The design parameters and drawings are then displayed 140. In one embodiment, the design parameters are displayed 140 in a tabular format (not shown in FIGS. 4 and 5) and are included and displayed 140 with the drawings.

Figure 6:
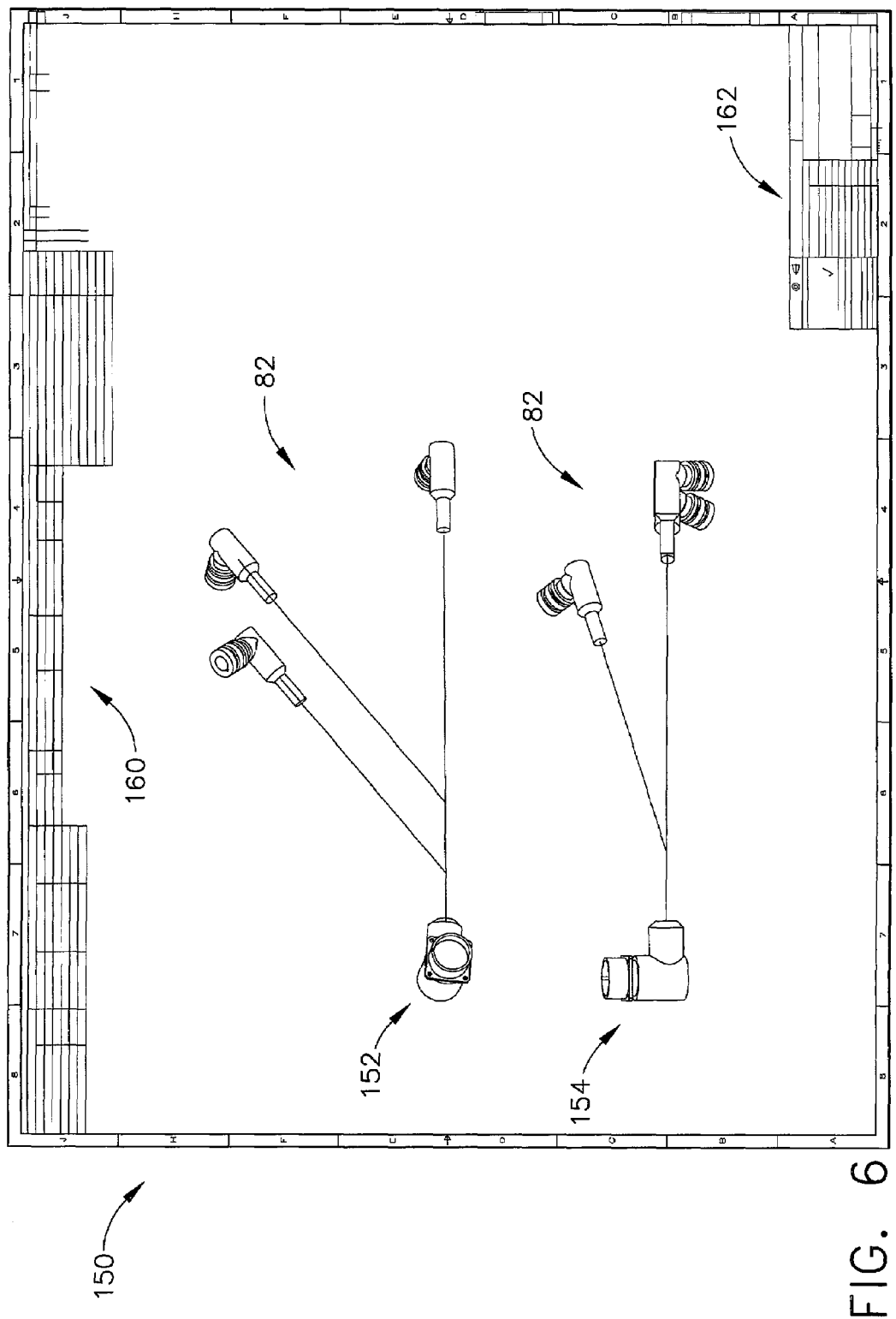
FIG. 6 is an exemplary output generated using the modeling system shown in FIG. 3.

FIG. 6 is an exemplary output 150 generated using modeling system 30 (shown in FIG. 1) and illustrating two-dimensional electronically modeled aircraft harness 82. In the exemplary embodiment, harness 82 is illustrated in a first orientation 152 viewed along an X-Y plane, ad a second orientation 154 along a Z-X plane. In another embodiment, harness 82 may be rotated to any other orientation. In the exemplary embodiment output 150 also includes a reference table 160 and a title box 162.

Figure 7:
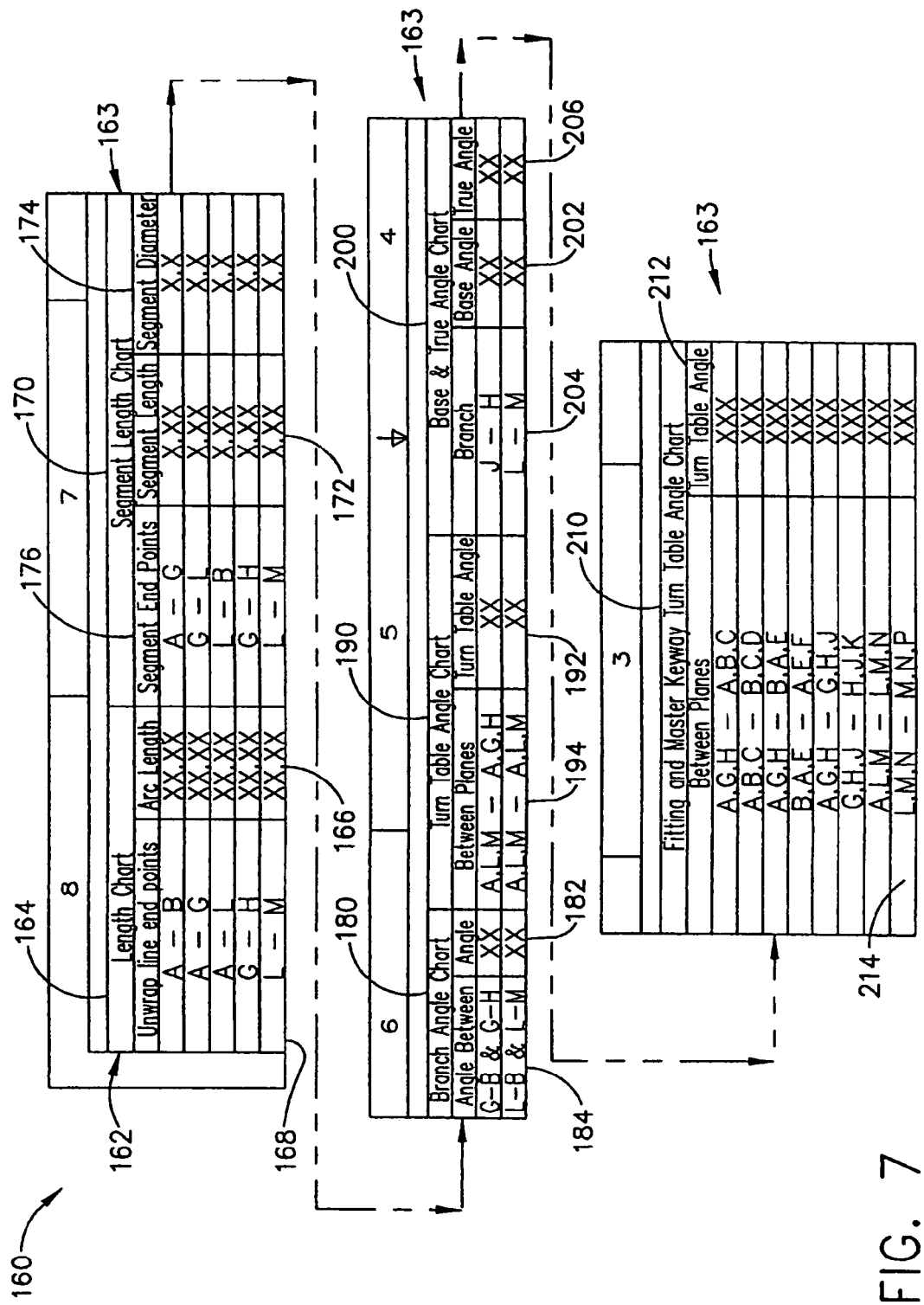
FIG. 7 is an exemplary reference table generated using the modeling system shown in FIG. 3.

FIG. 7 is an exemplary reference table 160 generated by processing system 10 (shown in FIG. 1) under the control of program 30 (shown in FIG. 1) and in accordance with the method shown in FIG. 3. Reference table 160 includes a plurality of data portions 163 utilized for manufacturing ad inspection. More specifically, reference table data portions 153 enable a harness (not shown) to be manufactured from a two-dimensional electronically modeled aircraft engine harness, such as harness 82 (shown in FIG. 6).

A length chart portion 164 provides various lengths 166 of segments 168 of harness 82 (shown in FIG. 6). More specifically, length chart portion 164 provides ordinate lengths along harness cable center line 108 and each branch line 110. Harness segments 168 are defined using coordinate points A, B, C, D, E, F, G, H, J, K, L, M, N, and P, and branch points G and L.

A segment length chart portion 170 provides lengths 172 of harness 82 between harness branches 110. Segment length chart portion 170 also provides segment diameters 174 of portions 176 of harness 82 along harness cable center line 108 and each branch line. Harness portions 176 are defined using coordinate points A, B, C, D, E, F, G, H, J, K, L, M, N, and P, and branch points G and L. Diameters 174 are determined using a diameter calculation program (not shown).

A branch angle chart portion 180 provides branch breakout angles 182 (illustrated in FIG. 5) of various defined portions 184 of harness 82. Portions 184 are defined using coordinate points A, B, C, D, E, F, G, H, J, K, L, M, N, and P, and branch points G and L. In one embodiment, breakout angles 182 are in increments of approximately fifteen degrees, and each breakout angle 182 is between approximately thirty and ninety degrees.

A turn table angle chart portion 190 defines a turn table angle 192 (illustrated in FIG. 4) between two planes 194 defined with adjacent harness branches 110. The planes intersect in a straight line (not shown) that is coincident with centerlines (not shown) of each straight length common to both angles. Turn table angle 192 is defined between the straight length and a previous branch breakout angle 182, and is measured in a counter-clockwise direction from a plane 194 defined by a previous branch 110.

A base and true angle chart portion 200 defines a base angle 202 (measured relative to X-Y plane and to branches 204, and measured in a counter-clockwise direction from the X-axis). A true angle 206 is measured from X-Y plane.

A fitting and master keyway turn table angle portion 210 defines a turn table angle 212 using a straight line (not shown) that is coincident with an intersection between a first three point plane (not shown) and a second three point plane. Turn table angle 212 is defined between the straight line and a previous angle 214, and measured in a counter-clockwise direction from the plane of previous angle 214. The above-described modeling system is cost-effective and accurate.

The modeling system generates a two-dimensional electronic model from a three-dimensionally defined harness. Furthermore, the modeling system facilitates unfolding a three-dimensionally defined harness in a shorter time duration than is possible with known harness unfolding methods. Accordingly, the modeling system provides a definition of a harness that is the same in a manufactured condition as in a designed condition. As a result, the modeling system produces two-dimensional electronic models for manufacturing in a cost-effective and reliable manner.

While the invention has been described in terms of various specific embodiments, those skilled in the art will recognize that the invention can be practiced with modification within the spirit and scope of the claims.

What is claimed is:

1. A method comprising the steps of:
generating two-dimensional electronically modeled aircraft engine harnesses from a three-dimensional harness definition that includes a plurality of connector fittings coupled together with wire cables, wherein said three-dimensional harness definition defines a harness, said generating the two-dimensional electronically modeled aircraft engine harnesses comprises:
defining the three-dimensional harness definition such that each of the plurality of connector fittings includes a plurality of connector fitting ports for orienting the connector fitting with respect to each other of the plurality of connector fittings in a cartesian coordinate system, wherein each of the plurality of connector fittings includes a connector port, a direction port, a free port, and a key port;
determining design parameters of the harness;
generating a two-dimensional stick form model of the plurality of connector fittings from the three-dimensional harness definition such that the appearance and orientation of each connector fitting image produced is three-dimensional with respect to each other of the plurality of connector fittings;
creating, by a processor, a first line that extends from a first one of the plurality of connector fittings to a second one of the plurality of connector fittings; and
producing a second line that extends from said first line to a third one of said plurality of connector fittings.

2. A method in accordance with claim 1 further comprising the steps of displaying the design parameters in a tabular output.

3. A method in accordance with claim 2 wherein said step of determining design parameters further comprises the step of determining at least one of a branch angle, abase angle, and a tile angle for the harness.

4. A method in accordance with claim 2 wherein said step of determining design parameters further comprises the step of determining at least one of a wire length, a fitting keyway, and a master keyway for the harness.

5. A method in accordance with claim 2 wherein said step of determining design parameters further comprises the steps of:
determining a length between adjacent harness branches; and
determining location of diametrical changes of the harness.

6. A modeling system for producing a two-dimensional electronic model of an aircraft engine harness, said system configured to:
generate a three-dimensional harness definition that includes a plurality of connector fittings coupled together with wire cables, wherein each of the plurality of connector fillings includes a connector port, a direction port, a free port, and a key port such that each of the plurality of connector fittings are oriented with respect to one another in a cartesian coordinate system, wherein said three-dimensional harness definition defines a harness;
generate a two-dimensional electronic drawing of each of the plurality of connector fittings from the three-dimensional harness definition such that the appearance and orientation of each connector fitting image produced is three-dimensional with respect to each other of the plurality of connector fittings;
generate a first line that extends from a connector port of a first one of the plurality of connector fittings to a connector port of a second one of the plurality of connector fittings; and
generate a second line that extends from said first line to a connector port of a third one of said plurality of connector fittings to produce the two-dimensional electronic model.

7. A modeling system in accordance with claim 6 wherein said system further configured to determine at least one of a brunch angle, a wire length, and a base angle of the harness.

8. A modeling system in accordance with claim 7 wherein said system further configured to define each of the connector fittings of the harness.

9. A modeling system in accordance with claim 6 said system further configured to determine at least one of a harness true angle, a fitting keyway, and a master keyway of the harness.

10. A modeling system in accordance with claim 6 wherein said system further configured to determine a length between adjacent harness branches.

11. A modeling system in accordance with claim 6 wherein said system further configured to determine locations of diametrical changes of the harness branches.

12. A system for generating a two-dimensional electronic model of an aircraft engine harness from a three-dimensional aircraft engine harness definition that includes a plurality of connector fittings coupled together with wire cables, said system comprising a processor programmed to:
define said tree-dimensional aircraft engine harness definition, wherein each of the plurality of connector fittings includes a plurality of connector fitting ports for orienting the connector fitting with respect to each other of the plurality of connector fittings in a cartesian coordinate system, wherein said three-dimensional aircraft engine harness definition defines a harness wherein each of the plurality of connector fittings includes a connector port, a direction port, a free port, and a key port;
determine aircraft engine harness design parameters from the three-dimensional aircraft engine harness definition; and
generate said two-dimensional electronic model of said aircraft engine harness in stick form using said three-dimensional aircraft engine harness definition and said aircraft engine harness design parameters, such that the appearance and orientation of each connector fitting image produced is three-dimensional with respect to each other of the plurality of connector fittings.

13. A system in accordance with claim 12 wherein said processor further programmed to determine parameters including at least one of a branch angle, a base angle, and a true angle.

14. A system in accordance with claim 12 wherein said processor further programmed to determine parameters including at least one of a wire length, a fitting keyway, and a master keyway.

15. A system in accordance with claim 12 wherein said processor further programmed to determine design parameters of the harness to display the design parameters in a tabular format.

16. A system in accordance with claim 12 wherein said processor further programmed to define each of the connector fittings.

17. A system in accordance with claim 12 wherein said processor further programmed to determine a length between adjacent aircraft engine harness branches.

18. A system in accordance with claim 12 wherein said processor further programmed to determine locations of diametrical changes of the harness branches.

\* \* \* \* \*

UNITED STATES PATENT AND TRADEMARK OFFICE
CERTIFICATE OF CORRECTION

PATENT NO.        : 7,024,341 B2                                           Page 1 of 1
APPLICATION NO.   : 09/780814
DATED             : April 4, 2006
INVENTOR(S)       : Barrow et al.

It is certified that error appears in the above-identified patent and that said Letters Patent is hereby corrected as shown below:

In Claim 3, column 5, line 55, delete "abase" and insert therefor -- a base --.
In Claim 3, column 5, line 56, delete "tile angle" and insert therefor -- true angle --.
In Claim 5, column 5, line 66, delete "location" and insert therefor -- locations --.
In Claim 6, column 6, line 7, delete "fillings" and insert therefor -- fittings --.
In Claim 7, column 6, line 29, delete "brunch angle" and insert therefor -- branch angle --.
In Claim 12, column 6, line 48, delete "tree-dimensional" and insert therefor -- three-dimensional --.

Signed and Sealed this

Twenty-seventh Day of November, 2007

JON W. DUDAS
*Director of the United States Patent and Trademark Office*